United States Patent [19]

Sakai

[11] Patent Number: 5,060,184
[45] Date of Patent: Oct. 22, 1991

[54] WORD PROCESSING APPARATUS
[75] Inventor: Toshiyuki Sakai, Nagoya, Japan
[73] Assignee: Brother Kogyo Kabushiki Kaisha, Japan
[21] Appl. No.: 587,558
[22] Filed: Sep. 24, 1990

Related U.S. Application Data

[63] Continuation of Ser. No. 141,591, Jan. 5, 1988, abandoned.

[30] Foreign Application Priority Data

Jan. 7, 1987 [JP] Japan .................................... 62-2079

[51] Int. Cl.⁵ .............................................. B41J 5/30
[52] U.S. Cl. .................................. 364/900; 364/200; 400/63
[58] Field of Search ................... 364/200, 900; 400/63

[56] References Cited

U.S. PATENT DOCUMENTS

| | | | |
|---|---|---|---|
| 3,810,107 | 5/1974 | Goldman et al. | 364/200 |
| 4,655,620 | 4/1987 | Adams et al. | 364/900 |
| 4,671,684 | 6/1987 | Kojima et al. | 364/900 |
| 4,689,768 | 8/1987 | Heard et al. | 364/900 |
| 4,775,251 | 10/1988 | Suzuki et al. | 400/63 |
| 4,783,761 | 11/1988 | Gray et al. | 364/900 |
| 4,818,131 | 4/1989 | Sakai | 400/63 |
| 4,830,521 | 3/1989 | Sakai et al. | 400/63 |

OTHER PUBLICATIONS

Robert B. Wesson et al, *Perfect Writer Perfect Speller, Perfect Software, Inc, 702 Harrison, Berkeley, Calif. 94710, 1983,* pp. 18-1~22-3.

*Primary Examiner*—Allen R. MacDonald
*Assistant Examiner*—Christopher B. Shin
*Attorney, Agent, or Firm*—Evenson, Wands, Edwards, Lenahan & McKeown

[57] ABSTRACT

In a conventional word processing apparatus provided with a users' dictionary memory into or from which arbitrary words such as proper nouns can be stored or deleted, each word to be stored or deleted into or from the users' dictionary memory is required to be pointed out by a cursor in the case of the memory mode and to be pointed out by a print head in the case of the typewriter mode. Thus, a word processing apparatus is provided with a storage controlling arrangement for storing the word nearest to a pointer element of an outputting medium, which is a display or a printer, into the users' dictionary memory and a delete controlling arrangement for deleting the word nearest to the pointer element of the outputting medium from the users' dictionary memory.

8 Claims, 5 Drawing Sheets

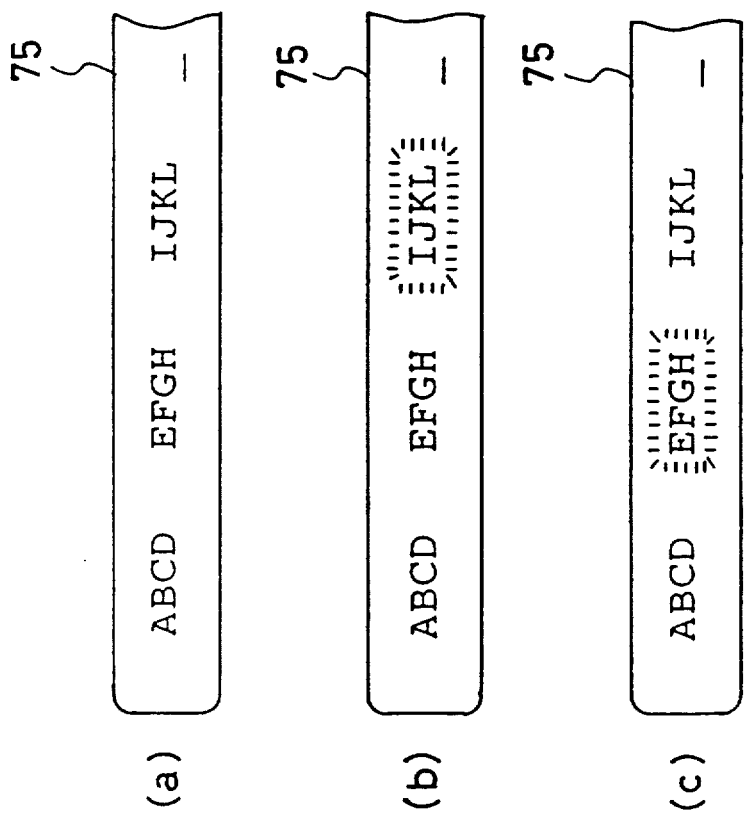

WORD PROCESSING APPARATUS

This is a continuation of Ser. No. 141,591, filed Jan. 5, 1988, now abandoned.

BACKGROUND OF THE INVENTION

The present invention relates to a word processing apparatus provided with a users' dictionary memory, and more specifically relates to a word processing apparatus which can easily perform word memory and word deletion into and from the users' dictionary memory.

In general, word processing apparatuses, for example, electronic typewriters are equipped with a ROM (read only memory)-type dictionary memory and a RAM (random access memory)-type users' dictionary memory in a controlling apparatus thereof, and the user can freely store or delete proper nouns, words, phrases which are not stored in the dictionary memory into the users' dictionary memory.

Then, where the spell checking mode is set in the memory mode, if a space is entered as a sectioning data after a proper noun has been entered, the proper noun is judged to be a wrongly spelled word.

In this case, that proper noun can be stored into the users' dictionary memory by depressing a storage key.

Also, by moving a cursor to the display position of a desired word already inputted and then depressing the storage key, that word can be stored into the users' dictionary memory.

When deleting a word from the users' dictionary memory, by depressing a delete key after entering the word, the word is deleted from the users' dictionary memory, or by moving the cursor to the display position of a desired word already inputted and then depressing a delete key, the desired word is deleted from the users' dictionary memory.

On the other hand, where the spell checking mode is set in the typewriter mode, if a space as a sectioning data is entered after a proper noun has been printed, the proper noun is judged to be a wrongly spelled word.

In this case, the proper noun can be stored into the users' dictionary memory by depressing the storage key.

Also, by moving a print head to the print position of a desired word already printed and then depressing the storage key, that word can be stored into the users' dictionary memory.

When deleting a word from the users' dictionary memory, the word is deleted from the users' dictionary memory by depressing the delete key after printing the word, or by moving the print head to the print position of a desired word and then depressing the delete key, that desired word is deleted from the users' dictionary memory.

In the conventional electronic typewriters provided with the above-mentioned dictionary memory and users' dictionary memory, in case where a word is stored or deleted into or from the users' dictionary memory in the memory mode, only when the word is inputted lastly and the cursor is not moved, the word can be stored into the users' dictionary memory by depressing the storage key, and the word can be deleted from the users' dictionary memory by depressing the delete key. However, as to the word other than the word described above, it is required to move the cursor to the display position of the word already inputted and displayed on a display.

Also, in the case of the typewriter mode, only when the word is printed lastly and the print head is not moved, the word can be stored into the users' dictionary memory by depressing the storage key, and the word can be deleted from the users' dictionary memory by depressing the delete key. However, as to the word other than the word described above, it is required to move a carriage to the print position of the word already printed by depressing a space key or a backspace key, and thus a problem remains that storing processing or deleting processing of the word cannot be performed quickly and the operationality is inferior.

SUMMARY OF THE INVENTION

The object of the present invention is to provide a word processing apparatus capable of easily performing word storage processing and word deleting processing even after moving a cursor or after moving a print head without pointing out the word to be stored or deleted into or from a users' dictionary memory by the cursor or the print head.

The present invention relates to a word processing apparatus having inputting arrangement for inputting data of characters and symbols and the like, outputting arrangement for outputting characters and symbols onto an outputting medium and a users' dictionary memory for storing words inputted and stored by a user; aforementioned word processing apparatus is characterized by comprising: storage controlling arrangement for storing into the users' dictionary memory a word nearest to a pointer element of the outputting arrangement among words outputted onto the outputting medium on receiving a storage command, and deletion controlling arrangement for deleting from the users' dictionary memory 1 word nearest to the pointer element of the outputting arrangement among words outputted onto the outputting medium on receiving a delete command.

In the word processing apparatus in accordance with the present invention, the word nearest to the pointer element among words outputted onto the outputting medium is stored in the users' dictionary memory by the storage controlling arrangement on receiving a storage command from the inputting arrangement.

The word nearest to the pointer element of the outputting arrangement among words outputted onto the outputting medium is deleted from the users' dictionary memory by the deletion controlling arrangement on receiving a deletion command from the inputting arrangement.

In accordance with the word processing apparatus of the present invention, as described above, the word nearest to the pointer element of the outputting arrangement is stored in the users' dictionary memory on receiving the storage command, and the word nearest to the pointer element of the outputting means is deleted from the users' dictionary memory on receiving the deletion command, and therefore where the outputting medium is a display, it is not required to move the cursor by depressing the cursor move key, and where the outputting medium is a print paper, it is not required to move the carriage by depressing the space key or the backspace key, and therefore operationality is improved and the storage processing or the deleting processing can be performed quickly.

BRIEF DESCRIPTION OF THE DRAWINGS

Drawings show a preferred embodiment in accordance with the present invention.

FIGS. 4(a)-(c) are explanatory views of storing processing or deleting processing of a word in the memory mode, respectively.

DESCRIPTION OF THE PREFERRED EMBODIMENT

Hereinafter, description is made on a preferred embodiment in accordance with the present invention with reference to drawings.

This embodiment is of the case where the present invention is applied to an electronic typewriter.

Figure 1:
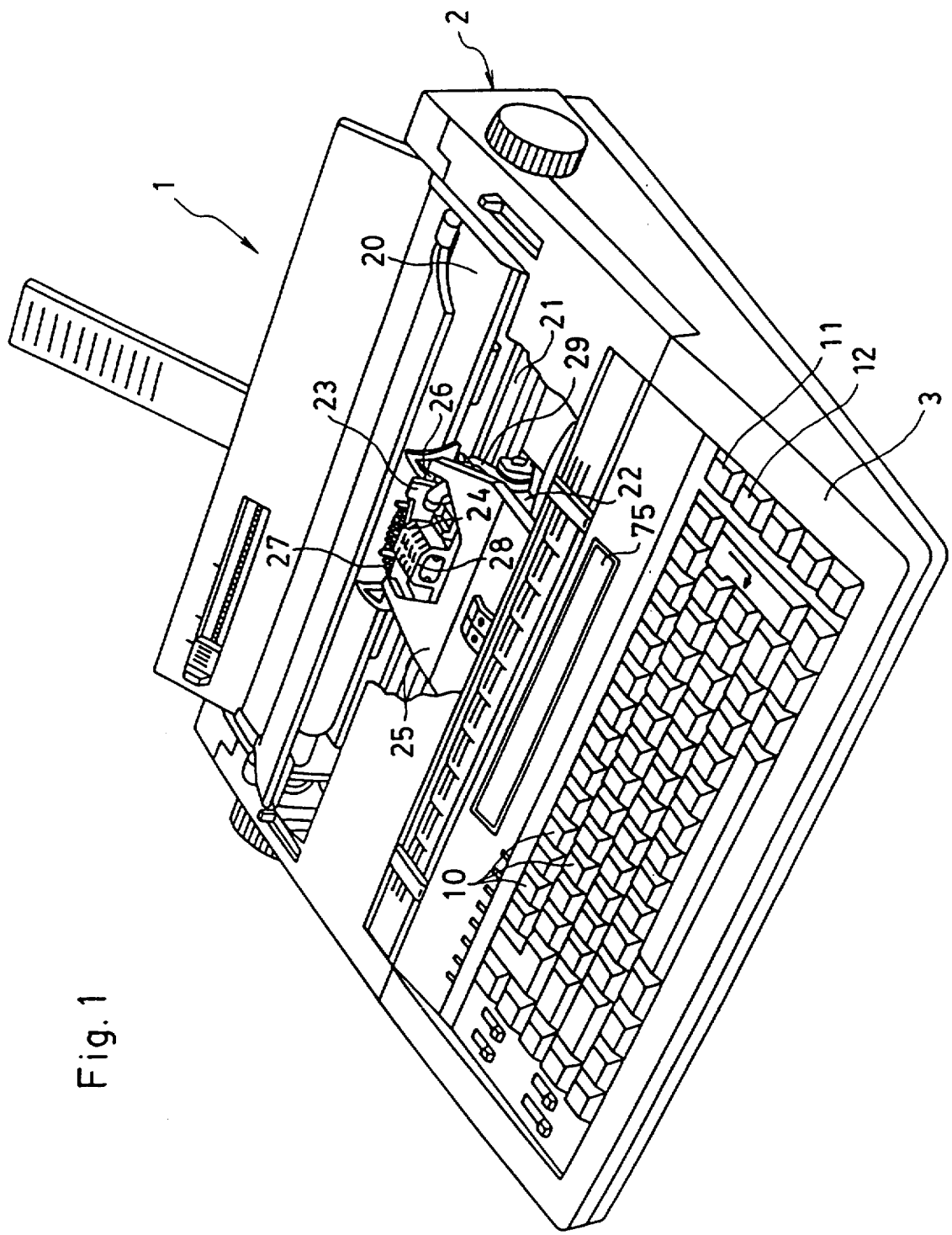
FIG. 1 is a partially-cut-out perspective view of an electronic typewriter.

As shown in FIG. 1, a keyboard 3 is disposed in the front part of a main frame 2 of the typewriter 1, and a printing mechanism PM is disposed behind the keyboard 3 in the main frame 2, and a one-line LCD display (liquid crystal display) 7 for displaying the inputted characters and symbols is installed in the rear part of the keyboard 3.

On the keyboard 3, alphabet keys, numeral keys, symbol keys and various function keys are installed likewise the ordinary typewriter, and further a storage key 11 for commanding to set a storing mode and to store a word into a users' dictionary memory 55 and a deletion key 12 for commanding to set a deleting mode and to delete a word stored in the users' dictionary memory 55 are installed on the keyboard 3.

In the printing mechanism PM, installed are at least a platen 20 for feeding a print paper and a motor driving it and a drive circuit thereof, a carriage 22 supported by a guide 21 parallel to the platen 20 and a motor driving it right and left reciprocatively and a drive circuit thereof, a type-wheel 24 housed in a wheel cassette 23 and a motor driving it and a drive circuit thereof, a type ribbon 26 stored in a ribbon cassette 25 and a motor taking it up and a drive circuit thereof, a print hammer for hammering a type element 27 of the type-wheel 24 and a solenoid 28 driving it and a drive circuit thereof, and a ribbon change-over mechanism selectively disposing the print ribbon 26 or a correction ribbon 29 to the print position, and this printing mechanism PM is the same as the printing mechanism of the ordinary electronic typewriter.

Figure 2:
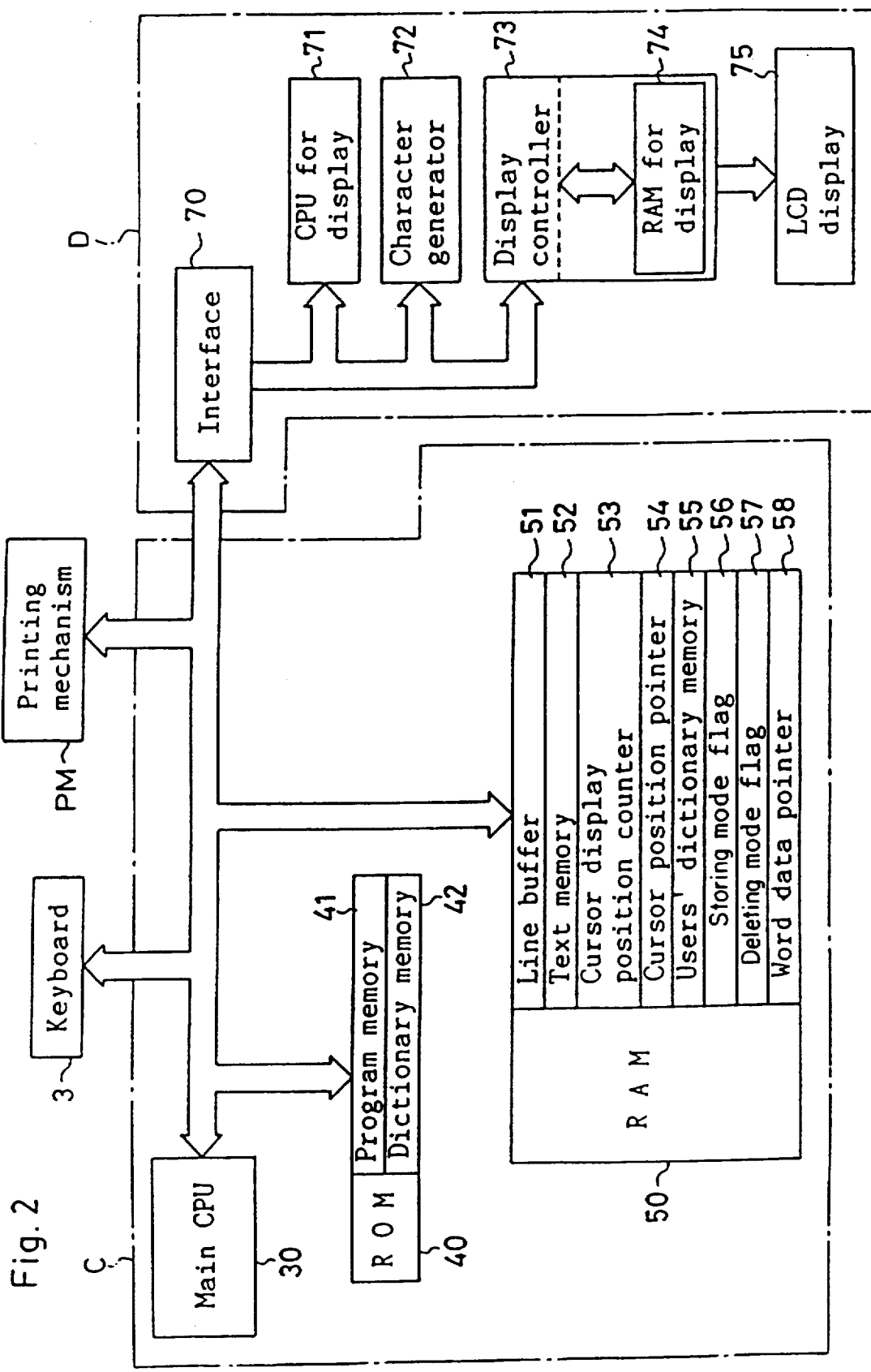
FIG. 2 is a block diagram of a control system of the typewriter.

Next, description is made on the whole configuration of a control system of the electronic typewriter 1 with reference to a block diagram in FIG. 2.

Basically the typewriter 1 is configurated with the keyboard 3, the printing mechanism PM, a displaying mechanism D and a controlling apparatus C, and the keyboard 3, the printing mechanism PM and the displaying mechanism D are connected to a main CPU (central processing unit) 30 through plural buses 31 such as a data bus etc.

The above-mentioned controlling apparatus C is configurated with the main CPU 30 and a ROM (read only memory) 40 and a RAM (random access memory) 50. The ROM 40 and the RAM 50 are connected to the main CPU 30 through plural buses 31.

In a program memory 41 of the ROM 40, a control program for controlling the printing mechanism PM and the displaying mechanism D in accordance with code data inputted from character keys and various function keys on the keyboard 3, a spell checking control program for spell check processing, a control program for storing/deleting processing control as described later are stored.

In a dictionary memory 42 of the ROM 40, for example, data of about 70,000 words are stored while classified in the alphabetic sequence likewise the ordinary dictionary for word spell checking.

In the RAM 50, installed are a current position memory which sequentially updates and stores the current position of the carriage 22 (print head) from the absolute origin (a position mechanically determined based on the reason derived from a proper construction of a device, which is usually set at a position slightly beyond a left margin in the leftward direction, and from which the carriage 22 factually cannot move further in the leftward direction) so as to correspond to respective print position in the typewriter mode, a line buffer 51 for sequentially storing data of about 500 characters of data such as printed characters and symbols in the same mode so as to correspond to respective print position, a text memory 52 for storing input data inputted from the keyboard 3 through the line buffer 51 in the memory mode, a cursor display position counter 53 for counting and storing the current cursor display position in response to respective cursor movement so as to correspond to each display position of a display 75, a cursor position pointer 54 for pointing an address in the line buffer 51 so as to correspond to data of the cursor display position counter 53, the users' dictionary memory 55 which can be accessed freely for storage and deletion of words such as a proper noun not stored in the dictionary memory 42, various memories for temporarily storing the result of processing in the main CPU 30, a storing mode flag 56 set when the storage key 11 is operated, a deleting mode flag 57 set when the deletion key 12 is operated, a word data pointer 58 which sequentially points the position of the head character of words stored in the line buffer 51 and stores sequentially the addresses thereof.

In the typewriter mode, according to the control program, the main CPU 30 makes the printing mechanism PM print characters and symbols corresponding to data inputted from each character key, and controls the line buffer 51 to store sequentially the printed data so as to correspond to respective print position.

Also, in the memory mode, the main CPU controls the line buffer 51 to store sequentially newest input data of characters and symbols corresponding to one print line, and controls the display 75 to display the input data by means of supplying the input data stored in the line buffer 51 and command data (control data) to a CPU 71 for display through a interface 70, and the main CPU 30 controls the text memory 52 to store the input data of one line in response to an operation of a return key.

The displaying mechanism D is the same as the well-known one, so brief description thereof will be made. The displaying mechanism D is constituted with the interface 70, the CPU 71 for display, a character generator 72, a display controller 73 and the LCD display 75 including a cursor 76 on it, and the connection thereof is made as shown in the diagram.

In the character generator 72, about 400 kinds of dot-matrix display data are stored correspondingly to code data of characters and symbols for displaying characters and symbols on the display 75.

Based on command data and code data outputted from the main CPU 30 through the interface 70, the CPU 71 for display reads out display data corresponding to these data from the character generator 72, and outputs the display data to the display controller 73. The display controller 73 writes the display data to a RAM 74 for display, and in response to command data from the main CPU 30 the display controller 73 reads out a plurality of display data corresponding to one display line from the RAM 74 for display, and while converting these display data into display signals the display controller 73 outputs these display signals to the display 75. Furthermore, the CPU 71 for display outputs cursor position control signals for pointing the address of destination of the cursor 76 to the display controller 73 in response to command data for cursor movement from the main CPU 30 through the interface 70.

When the deletion key 12 is operated, the main CPU 30 controls the printing mechanism PM based on data of the line buffer 51 and the current position memory, and the type element 27 same as the printed character is hammered through the correction ribbon 29, thereby the printed character is erased.

In the spell checking mode, in accordance with operating a word sectioning key (including symbol keys such as period, comma, colon and semicolon keys) such as the space key or the return key following input of the last character of a word, one or more words of the same spelling are detected by checking the inputted word against each word in the dictionary memory 42 and the users' dictionary memory 55. This spelling check processing is the same as the existing one, and therefore detailed description thereon is omitted.

Figure 3:
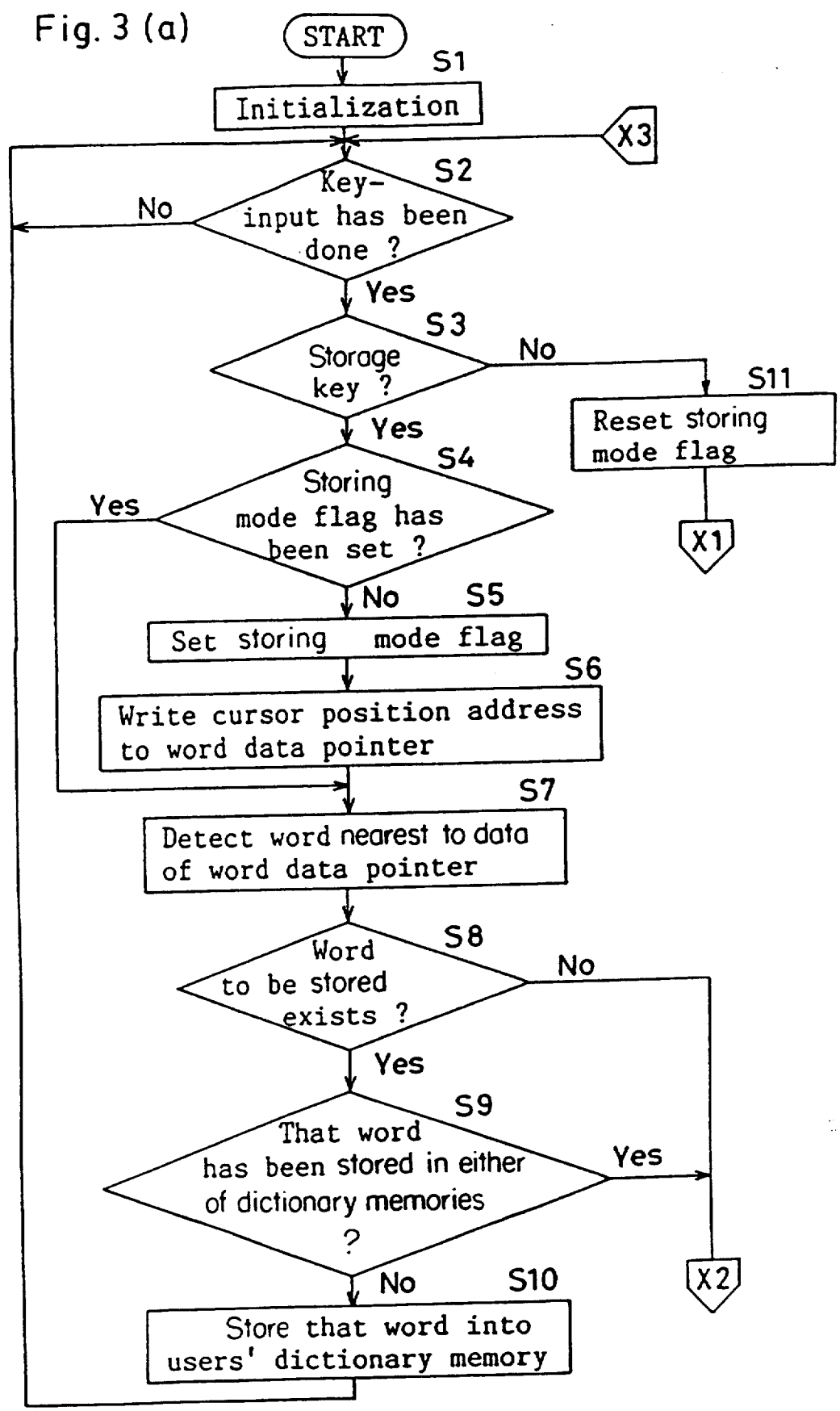
FIG. 3 is a flow chart of a routine of storing/deleting processing control.
Figure 3B:
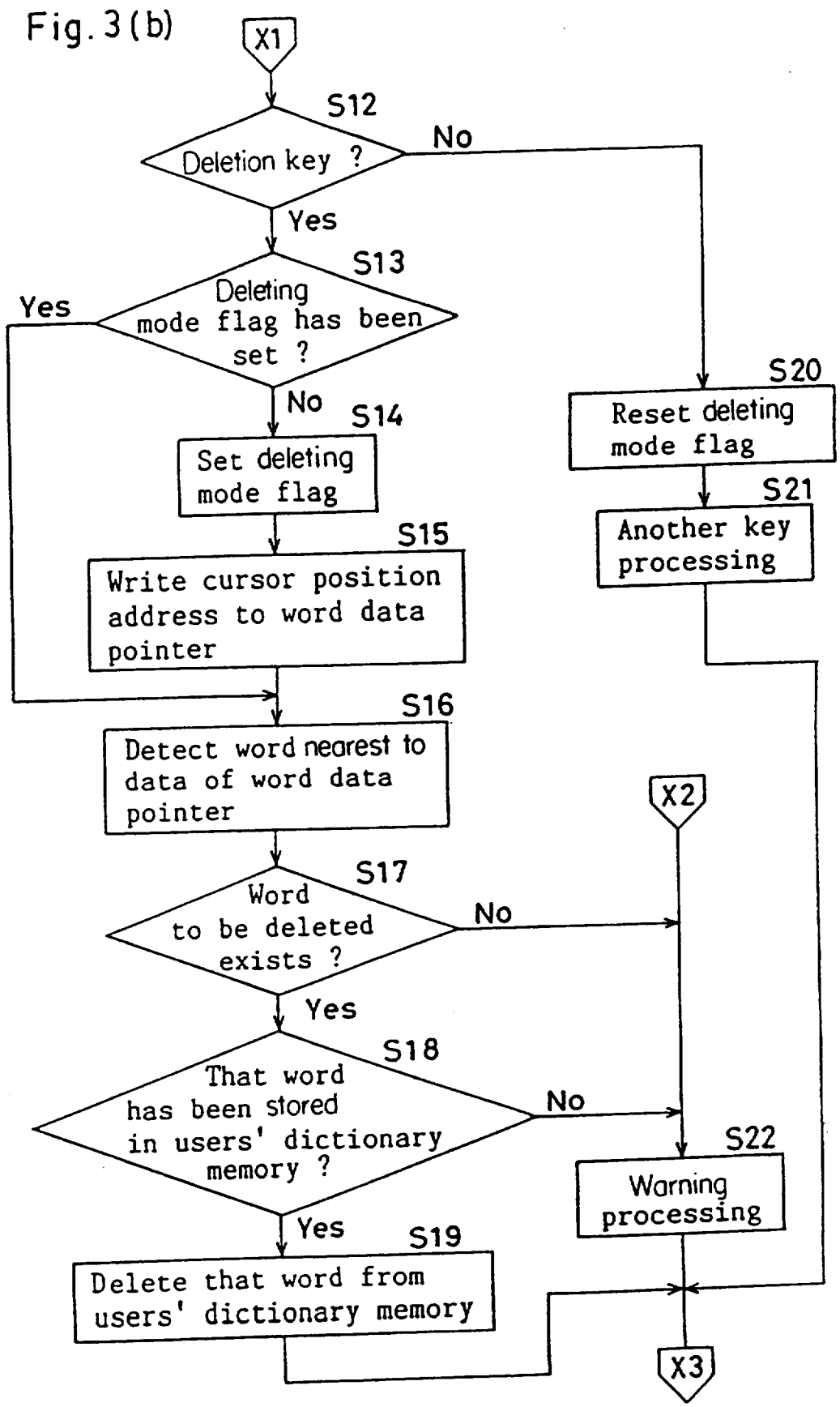

Next, description is made on storing/deleting processing control performed by the controlling apparatus C of the electronic typewriter 1 in the case where the word inputted and displayed on the display 75 in the memory mode is stored/deleted into/from the users' dictionary memory 55 with reference to a flow chart in FIG. 3.

In addition, when this storing/deleting processing control is started, for example, as shown in FIG. 4 (a), words "ABCD", "EFGH" and "IJKL" have been inputted and the space key has been operated three times.

When the power switch of the typewriter 1 is turned on, the control is started, and processing proceed to step S1 (hereinafter expressed simply as S1, and the same is true of the other steps), and initialization is executed, and processing waits for a key-input in S2.

When a key is operated, in S3, judgment is made on whether it is the storage key 11 or not, and when it is the storage key 11, in the next S4, judgment is made on whether or not the storing mode flag 56 has been set based on data of the storing mode flag 56, and when the flag 56 has not been set, the flag 56 is set in the following S5. When the storing mode flag 56 has been set in S4, processing proceeds to S7.

In the next S6, data of the cursor position pointer 54 (cursor position address data) is written into the word data pointer 58. In the following S7, based on data of the word data pointer 58 and the line buffer 51, a word nearest to the address pointed by the word data pointer 58 in the backspacing direction of the cursor 76 is detected by means of searching for a series of code data of characters in the line buffer 51, and in the next S8, judgment is made on whether or not the word to be stored into the users' dictionary memory 55 is present in the line buffer 51, and when the word to be stored is present, the position of the head character of the word (address of the head character) is written into the word data pointer 58, and processing proceeds to S9. For example, as shown in FIG. 4 (a), the word data pointer 58 points the head character "I" of the word "IJKL". In the judgment of S8, if there is one or more characters or symbols in the addresses upper than (i.e. in the backspacing direction) the address pointed by the word data pointer 58 in the line buffer 51, the judgment is Yes, and if otherwise, the judgment is No.

In S9, judgment is made on whether or not the word to be stored has already been stored in either of the dictionary memory 42 and the users' dictionary memory 55 based on data of the both dictionary memories 42 and 55, that is, the word undergoes spell check processing, and when the result of the judgment is No (wrong spelling or proper noun) and the word is not stored in the both dictionary memories 42 and 55, in the next S10, the word is stored into the users' dictionary memory 55, and processing returns to S2. At this time, for example, as shown in FIG. 4 (b), in accordance with command data supplied from the main CPU 30, the display controller 73 makes the word "IJKL" to be stored into the users' dictionary memory 55 blink.

In addition, when the judgment is No in S8 or when the judgment is Yes in S9, processing proceeds to S22 and warning is outputted by a buzzer or a lamp, and processing returns to S2.

When the storage key 11 is operated repeatedly steps S2-S4 and S7-S10 are repeated, the word data pointer 58 sequentially points the positions of the head characters of the words existing in the backspacing direction from the word pointed currently by the word data pointer 58, and then the words pointed by the word data pointer 58 are written sequentially into the users' dictionary memory 55 from the line buffer 51. At this time, for example, as shown in FIG. 4 (c), the words to be written to the users' dictionary memory 55 are controlled to blink in sequence.

When the deletion key 12 is operated, processing proceeds through S2-S3 to S11, and the storing mode flag 56 is reset, and judgment is Yes in the following S12, and processing proceeds to S13.

In S13, based on data of the deleting mode flag 57, judgment is made on whether or not the deleting mode flag 57 has been set, and if not set, the flag 57 is set in the following S14. When the deleting mode flag 57 has been set, processing proceeds to S16 from S13.

In the next S15, data of the cursor position pointer 54 (cursor position address data) is written into the word data pointer 58. In the next S16, based on data of the word data pointer 58 and the line buffer 51, a word nearest to the address pointed by the word data pointer 58 in the backspacing direction of the cursor 76 is detected by means of searching for a series of code data of characters in the line buffer 51, and in the following S17, judgment is made on whether or not the word to be deleted from the users' dictionary memory 55 is present in the line buffer 51, and when the word to be deleted is present, the position of the head character of the word (address of the head character) is written into the word data pointer 58, and processing proceeds to S18. For example, as shown in FIG. 4 (a), the word data pointer 58 points the head character "I" of the word "IJKL". In the judgment of S17, if there is one or more characters or symbols in addresses upper than (i.e. in the backspacing direction) the address pointed by the word data pointer 58 in the line buffer 51, the judgment is Yes, and if otherwise, the judgment is No.

In S18, based on data of the users' dictionary memory 55, judgment is made on whether or not the word to be deleted has already been stored in the users' dictionary memory 55, that is, the word undergoes spell check processing by use of the users' dictionary memory 55, and when no wrong spelling is detected as a result of judgment and the word is stored in the users' dictionary memory 55, the word is deleted from the users' dictionary memory 55 in the following step S19, and processing returns to S2. At this time, for example, as shown in FIG. 4 (b), in accordance with command data supplied from the main CPU 30, the display controller 73 makes the word "IJKL" to be deleted from the users' dictionary memory 55 blink.

In addition, when judgment is No in S17 or judgment is No in S18, processing proceeds to S22, and warning is outputted by a buzzer or a lamp, and processing returns to S2.

When the deletion key 12 is operated repeatedly, steps S2–S3, S11–S13 and S16–S19 are repeated, and the word data pointer 58 sequentially points the positions of the head characters of the words existing in the backspacing direction from the word currently pointed by the word data pointer 58, and then the words pointed by the word data pointer 58 are deleted sequentially from the users' dictionary memory 55. At this time, for example, as shown in FIG. 4 (c), the words to be deleted from the users' dictionary memory 55 are controlled to blink in sequence.

When judgment is No in S12, that is, when a key other than the storage key 11 or the deletion key 12 is operated, processing proceeds to S20, and the deleting mode flag 57 is reset, and in the following S21, according to the key operation, display control and printing control as a general typewriter are executed, and processing returns to S2.

In addition, in the above-mentioned embodiment one word is stored/deleted into/from the users' dictionary memory 55 every time the storage key 11/the deletion key 12 is depressed, but it is also possible that a plurality of words written into the line buffer 51 are in the users' dictionary memory 55 by one-time operation of the storage key 11 and are deleted from the users' dictionary memory 55 by one-time operation of the deletion key 12.

As described above, each word to be stored/deleted into/from the users' dictionary memory 55 which is inputted in advance and displayed on the display 75 is not required to be pointed by the cursor 76 through operation of the cursor 76, and therefore the operationality is improved and the efficiency of storing/deleting processing is enhanced.

In addition, in the aforementioned embodiment, each word displayed on the left side from the cursor display position is stored/deleted into/from the users' dictionary memory 55, but it is also possible that each word displayed on the right side from the cursor display position is stored or deleted sequentially from the word nearest to the cursor display position into or from the users' dictionary memory 55.

Furthermore, in the aforementioned embodiment, words to be stored or deleted into or from the users' dictionary memory 55 are displayed on the display 75 in the memory mode, but it is also possible that the present invention is applied to the typewriter mode, and each word printed on a print paper is stored or deleted into or from the users' dictionary memory 55. In this case also, each word is not required to be pointed by the print head of the carriage through operation of the space key or the backspace key, and therefore the operationality and the efficiency of storing/deleting processing are improved. In addition, at this time, the carriage 22 (print head) may be automatically moved in sequence to the print position of the word to be stored or to the print position of the word to be deleted.

What is claimed is:

1. A word processing apparatus comprising:
   inputting means for inputting data of characters, symbols and various command signals including a storage key for generating a storage command signal;
   memory means for storing data inputted from said inputting means;
   display means comprising a display for displaying characters and symbols corresponding to data stored in said memory means, and a cursor on said display for indicating a position of a character or symbol to be nextly inputted;
   cursor position counting means for counting and storing a current position of said cursor on said display, and current position of said cursor indicating the position of a character or symbol to be nextly inputted;
   address pointing means for indicating an address in said memory means corresponding to said current position of said cursor stored in said cursor position counting means;
   a users' dictionary memory for storing data of words to be supplied form said memory means;
   means for detecting operation of a key of said inputting means and for determining whether said key is the storage key;
   means responsive to operation of said storage key for causing the current position of said cursor stored in said cursor position counting means to be entered into said address pointing means;
   means responsive to the operation of said storage key and to the address stored in said address pointing means, for automatically detecting in said memory means a word nearest in the backspacing direction, to the address entered in the address pointing means, without movement of said cursor;
   comparing means for detecting an absence of said nearest word from among words stored in said users' dictionary memory, and for generating a storage signal in response thereto; and
   means responsive to said storage signal for causing said nearest word to be entered into said users' dictionary memory.

2. Word processing apparatus according to claim 1 further comprising:
   A detection key for generating a deletion command signal,
   means for detecting operation of a key of said inputting means and for determining whether said key is the deletion key;
   means responsive to operation of said deletion key for causing the current position of said cursor stored in said cursor position counting means to be entered into said address pointing means;
   means responsive to operation of said deletion key and to the address stored in said address pointing means, for automatically detecting in said memory means a word nearest, in the backspacing direction, to the address entered in the address pointing means, without movement of said cursor;

means for detecting presence of said nearest word among words stored in said user' dictionary memory, and for generating a deletion signal in response thereto; and means responsive to said delete signal for causing said nearest word to be deleted from said user' dictionary memory.

3. Word processing apparatus according to claim 1, further comprising:

means responsive to said storage command signal for causing a position in said memory means of a head character of said nearest word in the backspacing direction, to be entered into said address pointing means after said nearest word is determined to be present in said users' dictionary memory or is entered therein, whereby repeated operation of said storage key causes said comparing means to detect sequentially the absence of the next consecutive word in the backspacing direction, from the users' dictionary memory, and to generate a storage signal in response thereto.

4. Word processing apparatus according to claim 2, further comprising:

means responsive to said deletion command signal for causing a position in said memory means of a head character of said nearest word in the backspacing direction, to be entered into said address pointing means after said nearest word is determined to be absent from said users' dictionary memory or is deleted therefrom, whereby repeated operation of said deletion key causes said comprising means to detect sequentially the presence of the next consecutive word in the backspacing direction, in the users' dictionary memory, and to generate a deletion signal in response thereto.

5. A word processing apparatus according to claim 3, wherein said display of said display means is a one-line display, and said memory means is a one-line buffer, and both correspond to each other.

6. A word processing apparatus according to claim 4, wherein said display of said display means is a one-line display, and said memory means is a one-line buffer, and both correspond to each other.

7. A word processing apparatus according to claim 3, wherein said display means includes means for causing a word, to be stored into said users' dictionary memory, to blink on said display in response to a storage command signal.

8. A word processing apparatus according to claim 4, wherein said display means includes means for causing a word, to be deleted from said users' dictionary memory, to blink on said display in response to a deletion command signal.

* * * * *